Sept. 19, 1939.   E. BERGWALL   2,173,224
SADDLE FOR BICYCLES, MOTORCYCLES, OR THE LIKE
Filed Dec. 14, 1937   2 Sheets—Sheet 1

INVENTOR
ERNST BERGWALL
Haseltine Lake & Co.
ATTORNEYS.

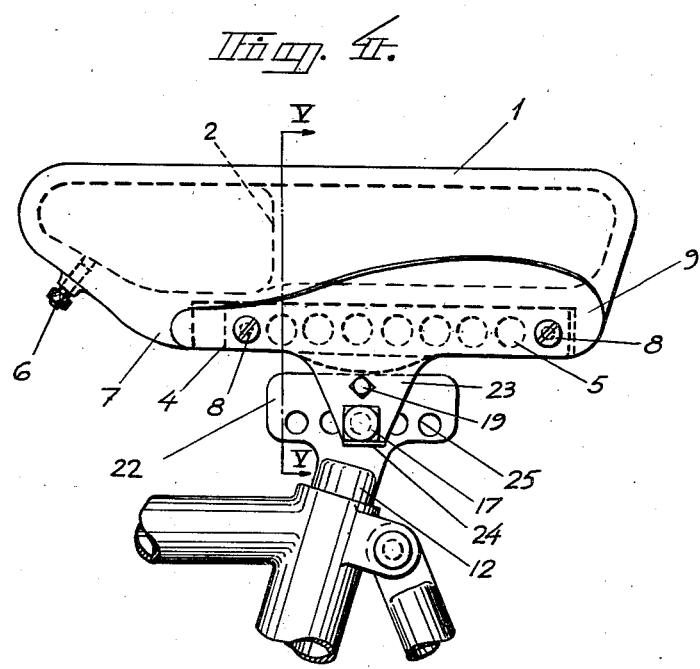
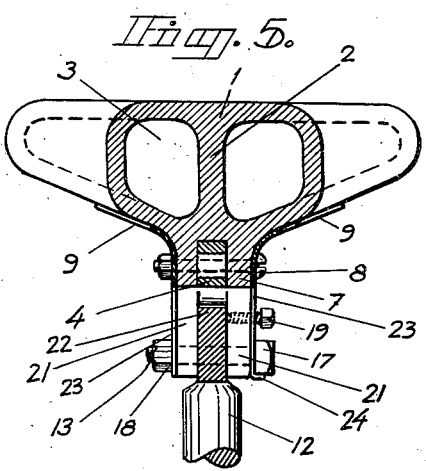

Patented Sept. 19, 1939

2,173,224

UNITED STATES PATENT OFFICE 2,173,224

SADDLE FOR BICYCLES, MOTORCYCLES, OR THE LIKE

Ernst Bergwall, Varnamo, Sweden

Application December 14, 1937, Serial No. 179,633
In Sweden November 3, 1934

4 Claims. (Cl. 155—5.15)

The present invention relates to supporting constructions for saddles for bicycles, motor cycles or the like comprising a hollow saddle body of rubber or other elastic material having a longitudinal flange of substantially the same length as said saddle body extending downwardly from the base surface portion of the saddle body.

One object of the invention is to provide a supporting construction for saddles of the above mentioned type, which simultaneously forms a reinforcement of the saddle body. For this purpose I provide carrier plates for the base surface portion of said saddle body of angle shaped cross section and substantially the same length as said flange on each side of the flange, a longitudinally and centrally extending rail engaging the flange, and a clamping bolt extending through openings in said carrier plates and said rail adapted to rigidly secure the saddle supporting construction to the bicycle or the like. Other objects and features of invention will become apparent from the following description and claims.

Figure 1:
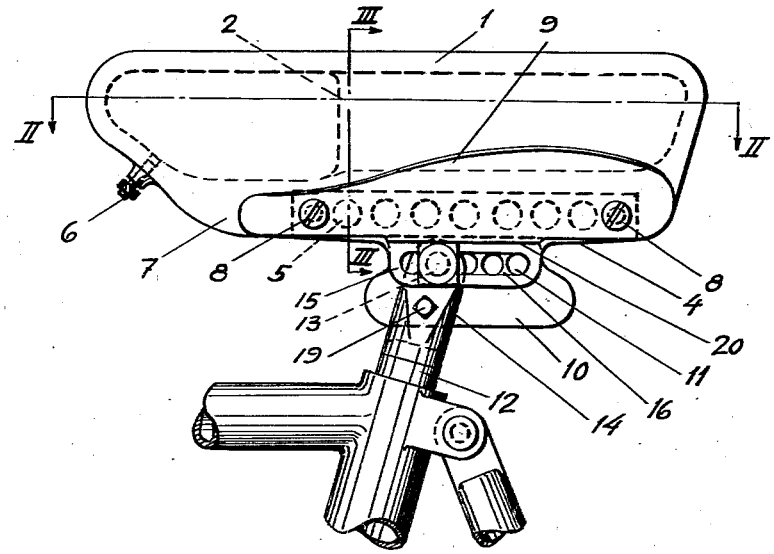

In the accompanying drawings two embodiments of the invention are illustrated by way of example. Fig. 1 is a side view of a saddle supporting construction according to the invention, Fig. 2 a section on line II—II in Fig. 1, and Fig. 3 a cross section on line III—III in Fig. 1. Fig. 4 is a side view of a saddle embodying another form of a supporting construction according to the invention, and Fig. 5 is a section on line V—V in Fig. 4.

The same reference numerals are in different figures used to indicate similar parts.

Figure 2:
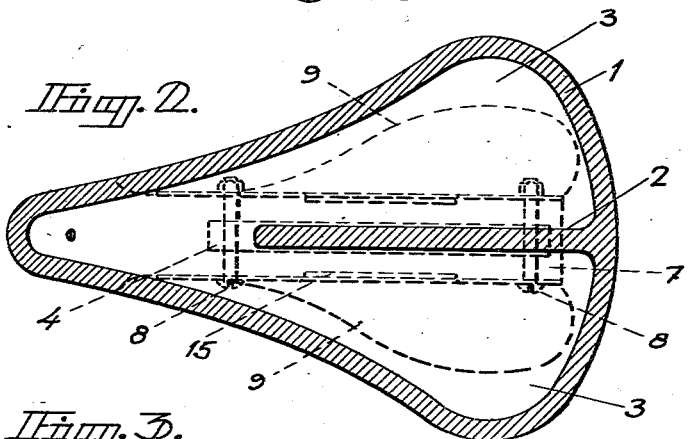
Figure 3:
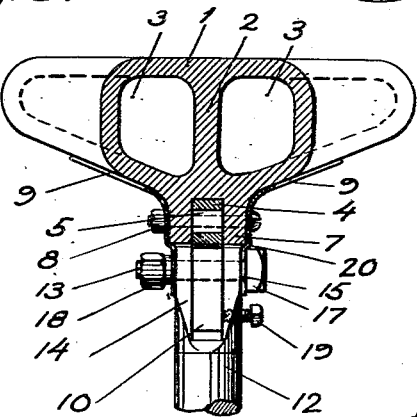

The saddle illustrated in Figs. 1-3 comprises a completely closed hollow saddle body 1 of rubber or other suitable elastic material, which may naturally be reinforced in a manner known per se, for instance by means of canvas, springs or the like moulded in the walls of the saddle body. In the present embodiment a centrally, vertically and longitudinally disposed partition 2 is provided in the rear portion of the interior of the saddle body. Said partition serves to strengthen the saddle body and divides its interior in two equal copartments 3 communicating with each other in the front portion of the saddle body. A valve 6 is provided in the front portion of the base surface of the saddle body, said valve being, for instance, of the type used in rubber tubes for bicycles and adapted for inflating the saddle compartments and keeping the saddle inflated at a certain pressure.

The cross section of the saddle body is substantially triangular and ends at the bottom with a longitudinal flange 7 secured by means of transverse bolts 8 to a carrier device comprising two support plates 9 engaging each side of said longitudinal flange 7. Said support plates 9, which may be of substantially L-shaped cross section, may be formed in such a manner that their breadths on each side of the flange 7 and consequently the breadths of the supporting surfaces for the base surface of the saddle body increase towards the rear portion of the saddle body, so that the stability of the saddle is essentially increased without the elastic properties of the saddle being detrimentally influenced. It is thus possible by varying the breadth and configuration of the surfaces of the support plates 9, on which the saddle body rests, to vary the stability of the saddle at different portions of the saddle body, and furthermore, the desired elasticity of the saddle may be obtained through proper adjustment of the pressure of the air cushion enclosed in the saddle body.

The longitudinal flange 7 has a downwardly opening groove in its base surface, in which groove a rail 4 or the like is inserted. Said rail 4, which among other things serves to reinforce the saddle body in the longitudinal direction, is provided with weight reducing bores 5 or the like and rigidly connected to the base of the saddle body by means of the above mentioned bolts. Obviously the rail 4 may be formed as a channel, in which the flange projecting from the base of the saddle body may rest, or in any other suitable manner. The rail 4 has a lengthy portion 10 projecting at the bottom of the flange 7 and provided with a number of openings 11 provided one behind the other in the longitudinal direction of said portion and each per se adapted to form a bearing for a bolt 13 inserted in the saddle post 12 of the vehicle. As is clearly obvious from Fig. 3 the upper part of the saddle post forms a fork, the branches 14 of which embrace the projecting portion 10 of the rail 4 and upon tightening of the bolt 13 press against the two opposite longitudinal surfaces of the rail. Each support plate 9 has a portion 15 projecting downwardly beneath the longitudinal flange 7 and provided with an aperture 16 for the passage of the bolt 13, said portions 15 being disposed on the outer sides of the branches 14 of the saddle post. Consequently, after tightening of the bolt 13 the support plates 9 of the saddle body are rigidly connected to the saddle post 12 due to the pressure exerted on the outer surfaces of said portions 15 by the head 17 and the nut 18 of the bolt 13.

Through the introduction of the bolt 13 in a suitable bore 11 in the rail 4 the saddle may obviously be placed in a desired position in the longitudinal direction. Furthermore, the saddle may be swung on the bolt 13 into a more or less inclined position and fixed in such a position through tightening of the bolt 13 and a screw 19 provided in one branch of the saddle post 12 and adapted to cooperate with one side of the projection 10 of the rail 4.

In the embodiment illustrated in Figs. 4 and 5 the rail 4 has two downwardly directed projections 21 forming a fork, which embraces a longitudinal rail 22 formed at the upper end of the saddle post 12. The bolt 13 is inserted in openings in the projections 21 and the support plates 9 are provided with projections 23 one of which may be folded as at 24 for locking the head 17 of the bolt 13. The rail 22 is provided with a number of openings 25, so that the saddle may be secured in different positions. A lock screw 19 is provided in one of the projections 21 by means of which the rail 4 and the saddle post 12 may be locked relatively to one another in a desired position.

The details of the invention may naturally be modified in several different ways without departing from the scope of the invention. For instance, the bores 11 or 25 may be replaced by longitudinal slots, the opposite edges of which might form a number of recesses corresponding to the cylindrical portion of the bolt 13. In order to secure the bolt 13 one or both support plates may be folded to form a flange 20, as illustrated in Figs. 1 and 3, for engaging the flat sides of the square or otherwise formed bolt head 17, or to form a locking lip, as indicated at 24 in Fig. 5. The engaging surfaces of the clamping device are made to contact minutely with the corresponding portions of the surfaces cooperating therewith, said cooperating surfaces on the forks or rails etc. being, for instance, knurled or provided with a number of points or the like engaging a number of notches corresponding to said points. In such case the lock screw 19 may be dispensed with. Instead of being secured to the saddle post the saddle may naturally be secured directly to the frame or some other part of a vehicle adapted to form a suitable support for the saddle. The cross section of the rails 4 and 22 may naturally depart considerably from the rectangular form illustrated in the drawings.

What I claim is:

1. In a supporting construction for a hollow saddle body of elastic material for bicycles, motorcycles or the like, a longitudinal flange of substantially the same length as said saddle body extending downwardly from the base surface portion of the saddle body, carrier plates for said base surface portion of angle shaped cross section and substantially the same length as said flange secured on each side of the flange, downwardly projecting portions on said carrier plates, a longitudinally and centrally extending rail engaging the flange, there being openings formed in said downwardly projecting portions and said rail, and a clamping bolt extending through said openings for rigidly securing the saddle supporting construction to the bicycle or the like.

2. In a supporting construction for a hollow saddle body of elastic material for bicycles, motorcycles or the like, a longitudinal flange of substantially the same length as said saddle body extending downwardly from the base surface portion of the saddle body, there being a centrally disposed longitudinal groove formed in the bottom of said flange, carrier plates for said base surface portion of angle shaped cross section and substantially the same length as said flange secured on each side of the flange, downwardly projecting portions on said carrier plates, a longitudinally and centrally extending rail engaging said longitudinal groove of the flange, therebeing also openings formed in said downwardly projecting portions and said rail, and a clamping bolt extending through said openings for rigidly securing the saddle supporting construction to the bicycle or the like.

3. In a supporting construction for a hollow saddle body of elastic material for bicycles, motorcycles or the like, a longitudinal flange of substantially the same length as said saddle body extending downwardly from the base surface portion of the saddle body, carrier plates for said base surface portion of angle shaped cross section and substantially the same length as said flange secured on each side of the flange, there being a centrally disposed longitudinal groove formed in the bottom of the flange, a longitudinally and centrally extending rail secured in said groove, a downwardly projecting longitudinally extending projection on said rail, there being also a longitudinally extending opening formed in said projection, and a clamping bolt extending transversely through said opening for rigidly securing the saddle supporting construction to the bicycle or the like.

4. In a supporting construction for a hollow saddle body of elastic material for bicycles, motorcycles or the like, a longitudinal flange of substantially the same length as said saddle body extending downwardly from the base surface portion of the saddle body, carrier plates for said base surface portion of angle shaped cross section and substantially the same length as said flange secured on each side of the flange, there being a centrally disposed longitudinal groove formed in the bottom of the flange, a longitudinally and centrally extending rail secured in said groove, a downwardly projecting forked portion on said rail, there being also openings in said forked portion, and a clamping bolt extending through said openings for rigidly securing the saddle supporting construction to the bicycle or the like.

ERNST BERGWALL.